US011138533B2

(12) United States Patent
Harris et al.

(10) Patent No.: US 11,138,533 B2
(45) Date of Patent: Oct. 5, 2021

(54) METHOD, APPARATUS, AND COMPUTER READABLE MEDIUM FOR ALLOCATING SALES COMMISSIONS

(71) Applicant: LOXA BEAUTY, Carmel, IN (US)

(72) Inventors: Robert Harris, Fishers, IN (US); Le Wang, Carmel, IN (US)

(73) Assignee: Beauty Systems Group LLC, Denton, TX (US)

( * ) Notice: Subject to any disclaimer, the term of this patent is extended or adjusted under 35 U.S.C. 154(b) by 1109 days.

(21) Appl. No.: 14/328,769

(22) Filed: Jul. 11, 2014

(65) Prior Publication Data

US 2016/0012365 A1 Jan. 14, 2016

(51) Int. Cl.
| | | |
|---|---|---|
| *G06Q 10/06* | (2012.01) | |
| *G06Q 20/10* | (2012.01) | |
| *G06Q 30/02* | (2012.01) | |
| *G06Q 30/06* | (2012.01) | |

(52) U.S. Cl.
CPC ....... *G06Q 10/06313* (2013.01); *G06Q 20/10* (2013.01); *G06Q 20/102* (2013.01); *G06Q 30/0214* (2013.01); *G06Q 30/06* (2013.01)

(58) Field of Classification Search
CPC .............................................. G06Q 10/06313
See application file for complete search history.

(56) References Cited

U.S. PATENT DOCUMENTS

| | | | | |
|---|---|---|---|---|
| 6,334,111 | B1 * | 12/2001 | Carrott | G06Q 30/02 705/14.39 |
| 6,782,369 | B1 * | 8/2004 | Carrott | G06Q 10/0639 705/27.1 |
| 9,076,127 | B2 * | 7/2015 | Chao | G06Q 10/0633 |
| 10,713,676 | B1 * | 7/2020 | Chao | G06Q 20/10 |
| 2003/0014331 | A1 * | 1/2003 | Simons | G06Q 30/02 705/26.62 |
| 2007/0174160 | A1 * | 7/2007 | Solberg | G06Q 10/087 705/35 |

(Continued)

OTHER PUBLICATIONS

Wang et al, Strategic Choice of Electronic Marketplace Functionalities: a Buyer-Supplier Relationship Perspective, Journal of Computer-Mediated Communication, vol. 10, Issue 1, Nov. 1, 2004 (Year: 2004).*

(Continued)

*Primary Examiner* — Andre D Boyce
(74) *Attorney, Agent, or Firm* — Alston & Bird LLP (57) ABSTRACT

Provided herein are systems, methods and computer readable media for allocating sales commissions. In providing such functionality, a method may include, for example, receiving a set of transaction information for a transaction. The transaction information may include an indication of at least one product or service for which a sales commission is offered. The method may also include determining, based on the transaction information, whether a merchant is eligible to receive the sales commission, in response to determining that the transaction information does not identify a merchant that is eligible to receive the sales commission, selecting, using a processor, at least one merchant from a list of merchants selected from a plurality of merchants to receive the sales commission, and providing the sales commission to the selected at least one merchant.

31 Claims, 4 Drawing Sheets

(56) References Cited

U.S. PATENT DOCUMENTS

| | | | |
|---|---|---|---|
| 2007/0179873 A1* | 8/2007 | Solberg | G06Q 40/00 705/35 |
| 2007/0219871 A1* | 9/2007 | Rolf | G06Q 30/02 705/14.4 |
| 2009/0299820 A1* | 12/2009 | Wang | G06Q 30/0214 705/14.16 |
| 2012/0209673 A1* | 8/2012 | Park | G06Q 30/02 705/14.15 |
| 2013/0091032 A1* | 4/2013 | Prokop | G06Q 30/0241 705/26.2 |
| 2013/0138475 A1* | 5/2013 | Allison | G06Q 30/0201 705/7.29 |
| 2014/0249920 A1 | 9/2014 | Kerr et al. | |

OTHER PUBLICATIONS

Erin Anderson, The Salesperson as Outside Agent or Employee: A Transaction Cost Analysis, Marketing Science vol. 4, Issue 3 Aug. 1985 pp. 177-266 (Year: 1985).*

* cited by examiner

METHOD, APPARATUS, AND COMPUTER READABLE MEDIUM FOR ALLOCATING SALES COMMISSIONS

FIELD

Embodiments of the invention relate, generally, to electronic commerce systems and, more particularly, a methods and systems for allocating sales commissions.

BACKGROUND

Applicant has discovered problems with current methods for allocating sales commissions. Through applied effort, ingenuity, and innovation, Applicant has solved many of these identified problems by developing a solution that is embodied by the present invention, which is described in detail below.

BRIEF SUMMARY

In general, embodiments of the present invention provide herein systems, methods and computer readable media for allocating sales commissions. Embodiments include a method for allocating sales commissions. The method includes receiving a set of transaction information for a transaction. The transaction information includes an indication of at least one product or service for which a sales commission is offered. The method also includes determining, based on the transaction information, whether a merchant is eligible to receive the sales commission, in response to determining that the transaction information does not identify a merchant that is eligible to receive the sales commission, selecting, using a processor, at least one merchant from a list of merchants selected from a plurality of merchants to receive the sales commission, and providing the sales commission to the selected at least one merchant. The method may also include determining at least one manufacturer for the at least one product or service, and determining the list of merchants based at least in part on whether each of the plurality of merchants is associated with the at least one manufacturer. The method may include determining whether each of the merchants of the plurality of merchants is associated with the at least one manufacturer based at least in part on a sales volume of products associated with the at least one manufacturer sold by each of the plurality of merchants.

The transaction information may include a transaction location, and the method may include determining the list of merchants based on a proximity of each of the plurality of merchants to the transaction location. Selection of the at least one merchant may be based at least in part on a length of time since the at least merchant registered with a product distribution system. Selection of the at least one merchant may be based at least in part on a length of time since the at least one merchant last received a sales commission that was not associated with an eligible merchant based on the transaction information. Determining whether a merchant is eligible to receive the sales commission based on the transaction information may include determining whether the transaction information comprises a merchant identity. Determining whether a merchant is eligible to receive the sales commission may include determining whether the merchant identity is authorized to receive a commission from a manufacturer associated with the at least one product.

The merchant may be a hair stylist or salon, and the at least one product or service may be a hair care product. The method may include providing a consumer associated with the transaction contact information for the selected merchant. The selected at least one merchant may be selected based at least in part on the at least one merchant's prior sales of the at least one product or service. The method may also include determining a primary manufacturer for the transaction based on the at least one product or service associated with the transaction, and wherein the selected at least one merchant is selected based at least in part on a relationship between the selected at least one merchant and the primary manufacturer. The method may also include, in response to determining an eligible merchant to receive the sales commission based on the transaction information, selecting the eligible merchant as the selected at least one merchant.

Embodiments may further include an apparatus for allocating sales commissions. The apparatus includes at least one processor coupled to a memory. The memory includes computer executable instructions that, when executed by the processor, configure the apparatus. The instructions configure the apparatus to receive a set of transaction information for a transaction. The transaction information includes an indication of at least one product or service for which a sales commission is offered. The instructions further configure the apparatus to determine, based on the transaction information, whether a merchant is eligible to receive the sales commission. The instructions also configure the apparatus to, in response to determining that the transaction information does not identify a merchant that is eligible to receive the sales commission, select at least one merchant from a list of merchants selected from a plurality of merchants to receive the sales commission, and to provide the sales commission to the selected at least one merchant.

The apparatus may be further configured to determine at least one manufacturer for the at least one product or service, and to determine the list of merchants based at least in part on whether each of the plurality of merchants is associated with the at least one manufacturer. The apparatus may be further configured to determine whether each of the merchants of the plurality of merchants is associated with the at least one manufacturer based at least in part on a sales volume of products associated with the at least one manufacturer sold by each of the plurality of merchants. The transaction information may include a transaction location, and the apparatus may be further configured to determine the list of merchants based on a proximity of each of the plurality of merchants to the transaction location. Selection of the at least one merchant may be based at least in part on a length of time since the at least merchant registered with a product distribution system. Selection of the at least one merchant may be based at least in part on a length of time since the at least one merchant last received a sales commission that was not associated with an eligible merchant based on the transaction information. The apparatus may be further configured to determine whether a merchant is eligible to receive the sales commission based on the transaction information by at least determining whether the transaction information comprises a merchant identity. The apparatus may be further configured to determine whether a merchant is eligible to receive the sales commission further by at least determining whether the merchant identity is authorized to receive a commission from a manufacturer associated with the at least one product.

The merchant may be a hair stylist or salon, and the at least one product or service may be a hair care product. In some embodiments, the apparatus may be further configured to provide a consumer associated with the transaction contact information for the selected merchant. The selected at least one merchant may be selected based at least in part on the at least one merchant's prior sales of the at least one product or service. The apparatus may be further configured to determine a primary manufacturer for the transaction based on the at least one product or service associated with the transaction, and the selected at least one merchant may be selected based at least in part on a relationship between the selected at least one merchant and the primary manufacturer. The apparatus may be further configured to, in response to determining an eligible merchant to receive the sales commission based on the transaction information, select the eligible merchant as the selected at least one merchant.

Embodiments may also include a non-transitory computer readable storage medium including instructions that, when executed by a processor, configure the processor. The instructions configure the processor to receive a set of transaction information for a transaction. The transaction information includes an indication of at least one product or service for which a sales commission is offered. The instructions further configure the processor to determine, based on the transaction information, whether a merchant is eligible to receive the sales commission, to select, in response to determining that the transaction information does not identify a merchant that is eligible to receive the sales commission, at least one merchant from a list of merchants selected from a plurality of merchants to receive the sales commission, and to provide the sales commission to the selected at least one merchant.

The instructions may further configure the processor to determine at least one manufacturer for the at least one product or service, and to determine the list of merchants based at least in part on whether each of the plurality of merchants is associated with the at least one manufacturer. The instructions may further configure the processor to determine whether each of the merchants of the plurality of merchants is associated with the at least one manufacturer based at least in part on a sales volume of products associated with the at least one manufacturer sold by each of the plurality of merchants. The transaction information may include a transaction location, and the instructions may further configure the processor to determine the list of merchants based on a proximity of each of the plurality of merchants to the transaction location. Selection of the at least one merchant may be based at least in part on a length of time since the at least merchant registered with a product distribution system. Selection of the at least one merchant may be based at least in part on a length of time since the at least one merchant last received a sales commission that was not associated with an eligible merchant based on the transaction information. The instructions may further configure the processor to determine whether a merchant is eligible to receive the sales commission based on the transaction information by at least determining whether the transaction information comprises a merchant identity. The instructions may further configure the processor to determine whether a merchant is eligible to receive the sales commission further by at least determining whether the merchant identity is authorized to receive a commission from a manufacturer associated with the at least one product. The merchant may be a hair stylist or salon, and the at least one product or service may be a hair care product. The instructions may further configure the processor to provide a consumer associated with the transaction contact information for the selected merchant. The selected at least one merchant may be selected based at least in part on the at least one merchant's prior sales of the at least one product or service. The instructions may further configure the processor to determine a primary manufacturer for the transaction based on the at least one product or service associated with the transaction, and the selected at least one merchant may be selected based at least in part on a relationship between the selected at least one merchant and the primary manufacturer. The instructions may further configure the processor to, in response to determining an eligible merchant to receive the sales commission based on the transaction information, select the eligible merchant as the selected at least one merchant.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Introduction and Definitions

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

Sales commissions are frequently offered to merchants to incentivize the sale of particular products or services. These commissions may be offered by a product manufacturer to incentivize the merchant to sell products manufactured by the manufacturer, or the commissions may be offered by a product distributor to incentivize the sale of products distributed by the distributor. In many cases, a commission may be offered by a manufacturer, by the merchant obtains the product from the distributor. In such cases, the distributor may be responsible for paying the commission to the merchant on behalf of the manufacturer.

When the product sale is conducted directly between a merchant and a consumer, determining how the commission should be allocated may be a relatively straightforward task. For example, the entire commission may be paid directly to the sales team member making the sale, a portion of the commission may be paid to the sales team member and a portion to the sales team member's employer (e.g., a hair salon), or the entire commission may be paid to the employer.

It has become increasingly common for consumers to obtain products through channels other than "brick-and-mortar" stores and face-to-face interaction with a sales team. The inventors have identified several problems with incentivizing product sales and marketing using sales commissions through these new sales channels. Online shopping and other e-commerce systems make it more difficult to determine which merchant marketed the product in a given transaction, thus increasing the difficulty in determining which merchant to reward with the sales commission. If a merchant cannot be identified for association with a particular transaction, the commission for the transaction may remain unallocated, thus depriving the manufacturer of the marketing benefit of incentivizing sales of the manufacturer's products, and depriving any merchant actually involved in marketing the product of their earned commission (e.g., in the case where a merchant recommends a product to a user, but the user purchases the product online without naming the merchant). Accordingly, Applicant has developed improved techniques for allocating sales commissions in an e-commerce environment to properly reward deserving merchants, thus preserving the ability of manufacturers to incentivize merchants for marketing of the manufacturer's products.

Example embodiments of the present invention present novel methods for determining which merchants should receive sales commissions. In particular, embodiments provide for the ability to identify relationships between consumers and particular merchants, and provide for a default commission allocation process in the event that a transaction is not associated with an identified prior relationship. Embodiments may leverage social networking techniques and customer relationship management systems to identify prior relationships. Embodiments may further allocate sales commissions so as to maximize the marketing benefit received by manufacturers from the sales commissions offered to merchants, thus improving the return-on-investment for manufacturers while also ensuring that the merchants are properly compensated by the commission allocations.

As used herein, the term "product distribution system" may include a service that provides consumers with the ability to purchase products or services. The product distribution system may be an e-commerce system (e.g., an e-commerce website) that allows consumers to purchase products using a personal computing device. Additionally or alternatively, the product distribution system may be implemented as a kiosk or in-store ordering system, or as part of a merchant point-of-sale system.

As used herein, the terms "manufacturer", "distributor", and "merchant", are used to describe a supply chain relationship relative to a consumer and to one another. It should be appreciated that the term "manufacturer" is used to describe an entity that provides a product to a distributor, and the term "distributor" is used to describe an entity that provides a product to a merchant. It should be understood that the manufacturer may or may not actually manufacture the product directly, such as in the case where the manufacturer is an intermediary between the distributor and an actual manufacturer. It should also be appreciated that a particular supply chain may include multiple distributors in parallel or series, and that sales commissions may be offered to the merchant by different entities in the supply chain. Although the term "merchant" is generally used to describe an entity that sells the product to an end-user or consumer, it should be appreciated that embodiments of the invention could also function where a mid-level distributor receives a commission for selling a product to a lower-level distributor. For example, although the general meaning of the term "merchant" may include a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce, this definition is not intended to be limiting.

The term "sales commission" is used to refer to a reward or value that is provided to a merchant for completing a transaction regarding a particular product or service. Although the term is most frequently used to apply to the sale of a good, product, or service, it should be appreciated that such sales commissions could also be offered in scenarios that involve the lease of a product such that title does not transfer to the consumer. Furthermore, although sales commissions are generally described with respect to financial transactions (e.g., a currency payment), the term "sales commission" should also be understood to encompass alternative reward structures, such as offering points which may be redeemed for products, trips, or the like.

Overview

Some example embodiments as described herein may be directed to methods and systems for allocating commissions offered by hair product manufacturers to salons or hair stylists through a distributor. In the salon industry, it is common for manufacturers to incentivize the sale of particular hair-care products by offering products to merchants (e.g., hair stylists or salons) at a discounted rate. Merchants that have a relationship with the manufacturer often receive a deeper discount from the manufacturer, allowing the merchant to earn more profit when selling the product to consumers. This business model allows merchants to build a mutually beneficial relationship with manufacturers, and vice-versa, incentivizing both parties. However, individual hair stylists and salons rarely have full-featured e-commerce sites. As such, in order for consumers to reap the benefit of any manufacturer discount passed on by the merchant to the consumer, consumers are limited to purchasing such products in-person. Consumers that elect to purchase product online may not obtain the benefit of such a discount, nor will they support their local stylist or salon. Online purchases are also less desirable from the perspective of the manufacturer, as such sales reduce the marketing benefit obtained by the manufacturer from their relationship with the merchant. To address these problems, the inventors have developed a system that allows consumers to benefit from the ease and convenience of an online e-commerce system, while still maintaining the benefits of the product ecosystem whereby manufacturers incentivize marketing activities by merchants. Embodiments further leverage the benefits of an e-commerce system to improve these marketing efforts to the benefit of all parties involved.

Example embodiments provide the ability to associate a sale of a hair care product to a particular salon or stylist through an e-commerce system. Embodiments may include the ability to associate a particular product transaction to a particular salon or stylist by analyzing transaction information. In the event a particular salon or stylist cannot be identified for the transaction, a default commission allocation process may be employed to allocate the commission for the transaction to a particular salon or stylist based on a process that maximizes the marketing value of the commission obtained by the manufacturer offering the commission.

Maximizing the marketing value of the commission may include a variety of methods for allocating the sales commission. For example, in some embodiments allocating the commission may include making a determination as to which merchant in a particular geographical area is the most likely to have marketed a product to the consumer making the transaction. Additionally or alternatively, embodiments may allocate the sales commission to particular merchants based on the time since the merchant last received a commission, based on the length of time the merchant has been registered with the product distribution system, based on a relationship between the merchant and one or more manufacturers of the products in the particular transaction, or according to a variety of metrics, processes, and combinations thereof.

It should be appreciated that while the example embodiments described herein are generally directed to the sale of hair care products and salon equipment, the instant embodiments may also be applied to any sale of products or services that include sales commissions offered by a manufacturer or distributor. As such, the instant application is not intended to be limited to a particular class of products or services. Furthermore, it will be appreciated the methods described for selecting a particular merchant for a sales commission award could also be adapted to other disciplines and industries, in any scenario that may benefit from improved methods of selecting a particular merchant or provider from a list (e.g., suggesting a merchant to a user, awarding contracts among a list of qualified bidders, or the like).

Example System Architecture and Example Apparatus

The method, apparatus, and computer program product of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, an example embodiment may be embodied by any of a variety of mobile terminals, such as a portable digital assistant (PDA), mobile telephone, smartphone, laptop computer, tablet computer, or any combination of the aforementioned devices.

Figure 1:
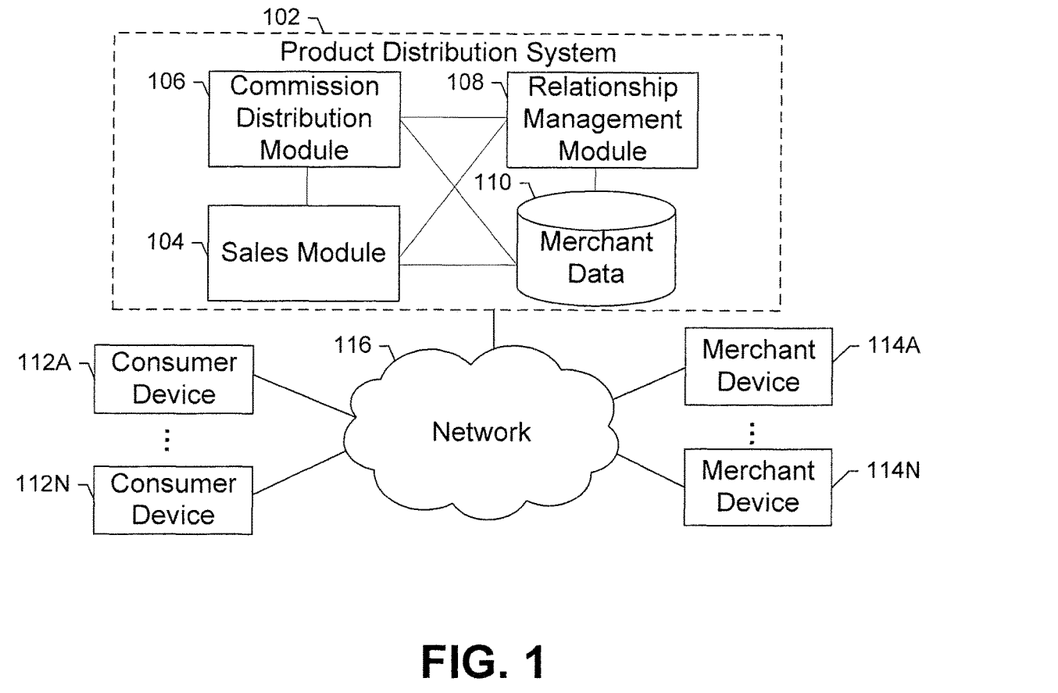
FIG. 1 depicts an example system in accordance with some embodiments described herein.

In this regard, FIG. 1 discloses an example computing system within which embodiments of the present invention may operate. Consumers and merchants may access a product distribution system 102 via a network 116 (e.g., the Internet, or the like) using computer devices 112A through 112N and 114A through 114N, respectively (e.g., one or more customer devices 112A-112N or one or more merchant devices 114A-114N). The product distribution system 102 may be implemented as one or more computer nodes (e.g., servers) that provide a sales module 104, a commission distribution module 106, a relationship management module 108, and a merchant datastore 110.

The product distribution system 102 may provide an interface allowing consumers to purchase products, such as, for example, hair care products. The product distribution system 102 may also allow merchants to register with the product distribution system 102 to facilitate management of interactions between the merchant and consumers, such as by allowing merchants to recommend particular products to consumers, instruct consumers in the use of products, schedule appointments for consumers, or the like. In this regard, the product distribution system 102 may provide merchants and consumers with tools to manage various aspects of the merchant-consumer relationship.

The sales module 104 may provide a sales interface, such as an e-commerce website, allowing a consumer to review and purchase products. These products may be presented through a searchable website, or they may be suggested for the consumer by a merchant. The product distribution system 102 may provide consumers with the ability to establish a user account. The relationship management module 108 may provide consumers with the ability to indicate a particular merchant as having a particular relationship with the consumer. For example, a consumer may indicate that they have their hair done at a particular salon or by a particular stylist. In response to the consumer indicating that they have a relationship with the merchant, the merchant may be provided with tools to suggest products or services to the consumer, to instruct the consumer on the use of particular products or services, and other tools for managing the relationship between the consumer and the merchant. In some embodiments, the relationship management module 108 further provides a mobile application allowing a merchant to interact with the product distribution system. Example embodiments of such a relationship management system are provided in U.S. patent application Ser. No. 14/194,658, which is herein incorporated by reference in its entirety.

To facilitate the relationship between consumers and merchants, merchants may be provided with the ability to register with the system and have registration information stored in a merchant datastore 110. When a merchant registers with the product distribution system, the product distribution system 102 may verify the merchant's identity and/or professional credentials. For example, the product distribution system 102 may verify that the merchant has a valid social security number and, if the merchant is associated with a particular employer (e.g., the merchant is a stylist employed by or contracting with a salon), the product distribution system 102 may confirm with the particular employer that the merchant is, in fact, approved by the particular employer (e.g., by sending an e-mail to an authorized representative of the employer requesting verification of the association). The merchant datastore 110 may further include information describing the merchant's relationship to particular consumers and manufacturers. For example, certain merchants may be authorized to distribute products from some manufacturers, but not others, or certain merchants may have preferred relationships with certain manufacturers, resulting in larger commissions from those manufacturers. The merchant datastore 110 may store this information to facilitate interactions between consumers, merchants, and manufacturers, and to assist with the commission allocation process.

The merchant datastore 110 may further store additional data about merchants, including merchant ratings provided by consumers or manufacturers, product recommendations provided by the merchant, specialties or certifications for the merchant, or the like. This information may also be used in the commission allocation process, such as to allocate commissions for certain products to merchants that specialize in using the product type of the product involved in the transaction, or to allocate commissions to merchants that have recently recommended the product to consumers.

The commission distribution module 106 may provide processes for allocating sales commissions derived from transactions processed by the sales module 104. As noted above, sales commissions may be offered by manufacturers or distributors to incentivize the sale of particular products by the merchants. The commission distribution module 106 operates to determine which merchant should be the recipient of commissions based on transaction information provided by the sales module 104. For example, the commission distribution module 106 may determine the identity of the consumer associated with the transaction, and, if the consumer has not indicated a relationship with a particular merchant, the commission distribution module 106 may review the merchant datastore 110 to determine if there is a prior relationship between a merchant and the consumer. If a prior relationship exists, the commission distribution module 106 may allocate the sales commission from the transaction to the merchant with the prior relationship with the consumer. If no prior relationship exists, the commission distribution module 106 may allocate the sales commission in a way that maximizes the marketing incentive benefit for the party offering the commission (e.g., the manufacturer or distributor). Example methods for allocating the commission are described further below with respect to FIGS. 3-5.

The commission distribution module 106 may also analyze transaction information to determine commission eligibility. Commissions for a particular transaction may be determined based on the individual products involved in the transaction, or based on the proportion of the sales total of each product with respect to the total of the entire transaction. For example, in some embodiments, if a product order includes products from several different manufacturers, separate commissions may be determined for each manufacturer. In other embodiments, an order with multiple products may have a single sales commission, and allocation of the commission may be determined based on which manufacturer, if any, comprises a majority of the sale total of the transaction.

In some embodiments, different manufacturers may have different methods of determining allocation of a commission if no prior relationship exists between the consumer performing the transaction and a particular merchant. For example, manufacturers may maintain lists of "preferred merchants" or "tier 1" merchants that receive preferential allocation of such sales commissions. In some embodiments, preferred merchants for particular manufacturers are determined dynamically by the product distribution system 102 based on sales volumes of manufacturer products sold. For example, the merchants with a top 10% sales volume sold through the product distribution system 102 for a given manufacturer may be designated as preferred merchants for that manufacturer. It should be understood that manufacturers may provide various additional or alternative criteria for identifying preferred merchants, including but not limited to providing lists of preferred merchants, setting different sales volume thresholds for consideration as a "preferred" merchant, or the like.

Figure 2:
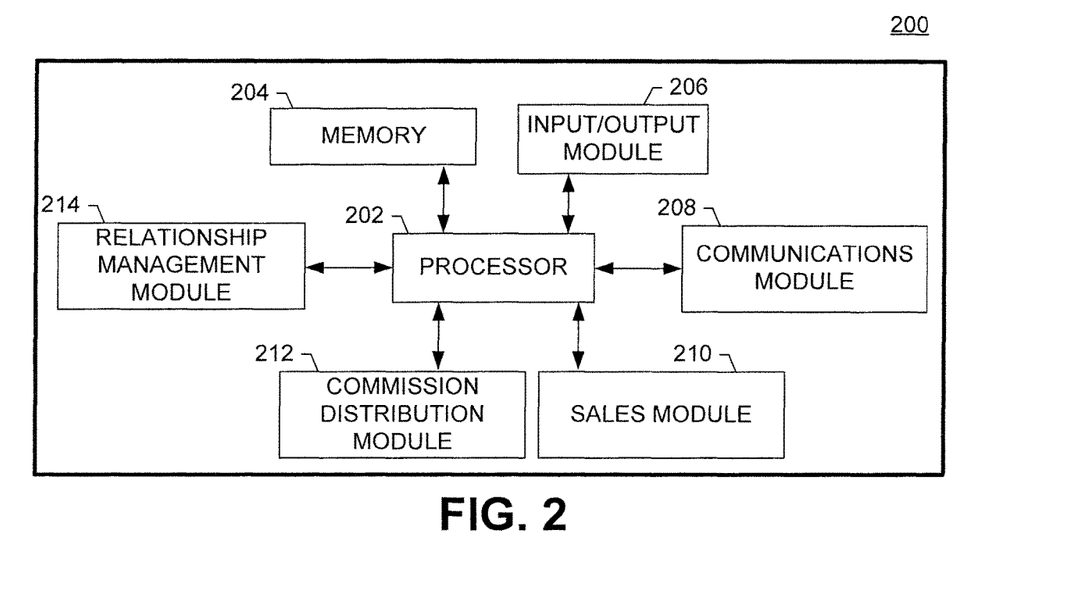
FIG. 2 depicts a schematic block diagram of circuitry that can be included in a computing device, such as a product distribution system, in accordance with some embodiments described herein.

The product distribution system 102 may be embodied by a computing system, such as an apparatus 200 shown in FIG. 2. As illustrated in FIG. 2, the apparatus 200 may include a processor 202, a memory 204, an input/output module 206, a communications module 208, a sales module 210, a commission distribution module 212, and a relationship management module 214. The apparatus 200 may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display and may comprise a web user interface, a mobile application, a client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The sales module 210 may provide commerce services to one or more consumers. In this regard, the sales module 210 may provide a website or other commerce interface that allows consumers to purchase products or services from a product distribution system. The sales module 210 may allow consumers to provide various information associate with a given transaction, including but not limited to particular products or services, a shipping address for the products or services, and a merchant for association with the sale of the product or service. Upon completion of a transaction, the sales module 210 may interface with a commission distribution module 212 to determine whether and how a commission should be distributed for the transaction.

The commission distribution module 212 may provide the sales module 210 with processes for determining which merchant should receive a commission from a particular transaction. As described above, the commission distribution module 212 may determine whether a commission should be paid for a particular transaction, and which merchant or merchants should receive the commission. The merchant receiving the commission may be selected based on a variety of factors associated with the merchant and/or the transaction, examples of which are described further below.

The relationship management module 214 may provide functionality for facilitating a relationship between consumers and merchants. As described above, the relationship management module 214 may allow merchants to manage consumer contact information and to interact with consumers such as by offering product instructions, demonstrations, recommendations, and the like. The relationship management module 214 may provide information about these relationships to the commission distribution module 212 to assist the commission distribution module 210 with selecting a merchant to receive a commission from a particular transaction.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Commission Allocation Data Flow

Figure 3:
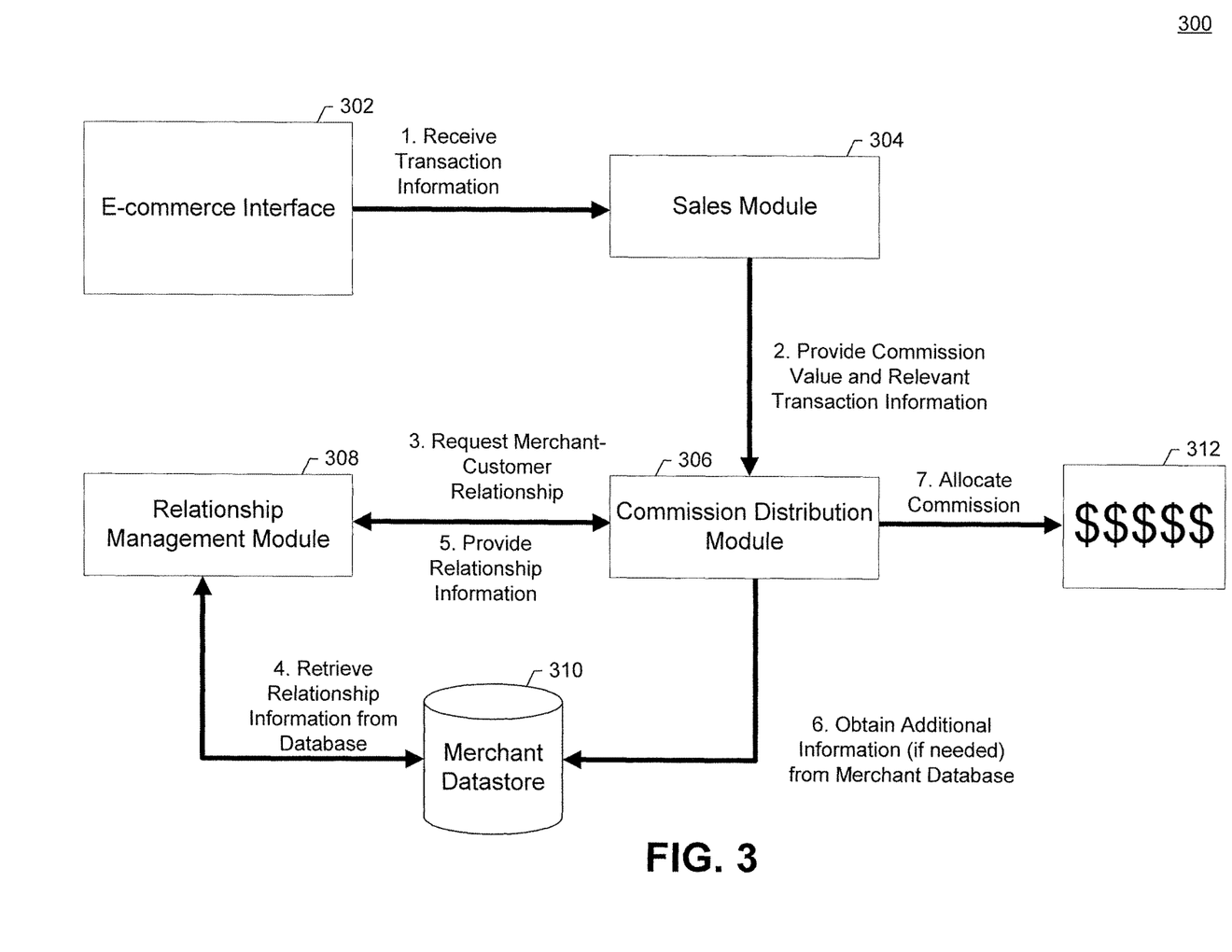
FIG. 3 depicts an illustration of a data flow for allocating a sales commission in accordance with some embodiments described herein.

FIG. 3 depicts an example data flow 300 illustrating a process for allocating a sales commission in accordance with some embodiments of the present invention. The data flow 300 may, for example, be implemented by an apparatus, such as described above with respect to the apparatus 200, or as part product distribution system 102 as described above with respect to FIG. 1. The data flow 300 illustrates how transaction information may be received from an e-commerce interface 302 via a sales module 304, and used as input to a commission allocation module 306 to determine allocation of a sales commission 312. The commission allocation module 306 may utilize a relationship management module 308 in conjunction with a merchant datastore 310 to assist with allocation of the sales commission 312.

The e-commerce interface 302 may receive transaction information from a consumer. The transaction information may include any information necessary to process the transaction. For example, the transaction information may include the consumer's name, address, phone number, a list of products to be purchased, payment information, or the like. The transaction information may be provided by the e-commerce interface to the sales module 304. The sales module 304 may be responsible for managing transactions received from the e-commerce interface 302. For example, the sales module 304 may validate the transaction, verify the consumer's billing information and payment method, generate an invoice, and ensure the products are shipped to the consumer. Processing of the transaction may also include determining whether a sales commission should be paid to a merchant for the transaction. To determine whether the sales commission should be paid, the sales module 304 may forward the transaction information to the commission distribution module 306.

The commission distribution module 306 may receive the transaction information and determine whether a sales commission should be paid for the transaction and, if so, to which merchant. Frequently, sales commissions may be determined based on a relationship between the consumer and a particular merchant. For example, if the consumer is associated with a particular salon or stylist, then sales commissions derived from transactions performed by the consumer may be allocated to the particular salon or stylist. To determine whether such a relationship exists, the commission distribution module 306 may interact with the relationship management module 308. As described above, the relationship management module 308 may include tools and resources for managing relationships between consumers and merchants. To determine whether a relationship exists between the consumer that is the subject of the transaction and a merchant, the relationship management module 308 may determine whether the consumer has been associated with a stylist within the merchant datastore 310. If such a relationship exists, the relationship management module 308 may identify the relationship to the commission distribution module 306. It should also be appreciated that, in some embodiments, the transaction information may include relationship information such that it is not necessary to consult the relationship management module 308. For example, the consumer may specify a particular merchant to receive the sales commission when completing the transaction.

If no relationship exists, then the commission distribution module 306 may consult the merchant datastore 310 to perform a default commission allocation. As described above, allocating of a sales commission when no merchant-consumer relationship exists may be performed in a manner that maximizes the marketing benefit for the manufacturer or distributor offering the commission. Example processes for maximizing the marketing benefit are described in further detail below with respect to FIGS. 4 and 5.

After determining the merchant that should receive the sales commission 312, the commission distribution module 306 distributes the sales commission 312. Distribution of the sales commission 312 may include depositing the sales commission in a merchant account (e.g., a merchant account specified when the merchant registers with the product distribution system), drafting a check payable to the merchant, or crediting an internal merchant account maintained by the product distribution system. As noted above, in some embodiments the sales commission 312 is not performed in legal tender, but instead in the form of other incentives such as points or credits that may be exchanged for goods or services.

Example Processing Operations Performed By Configured Apparatuses

Figure 4:
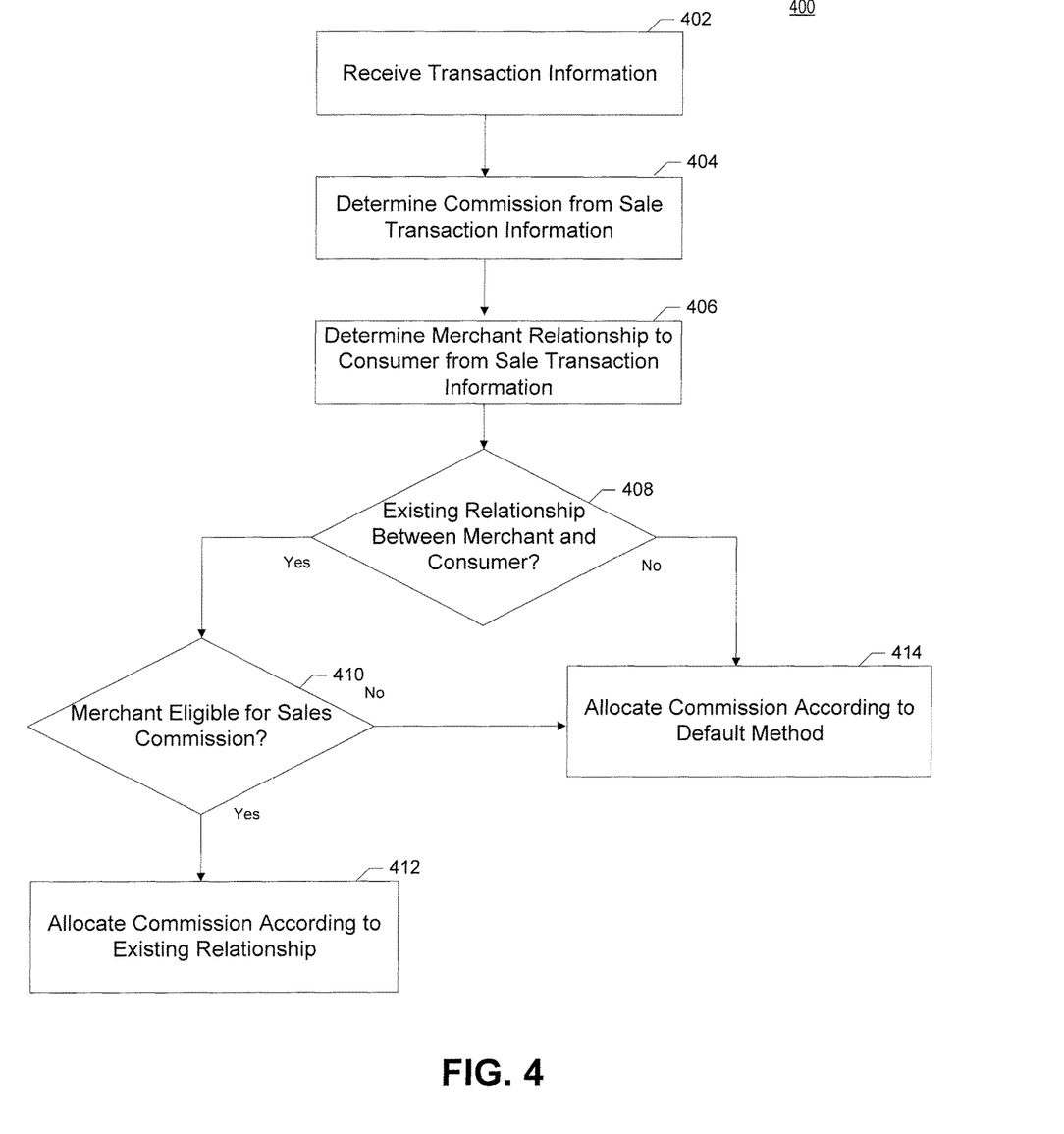
FIG. 4 depicts a flow diagram of a process for allocating sales commissions in accordance with some embodiments described herein.
Figure 5:
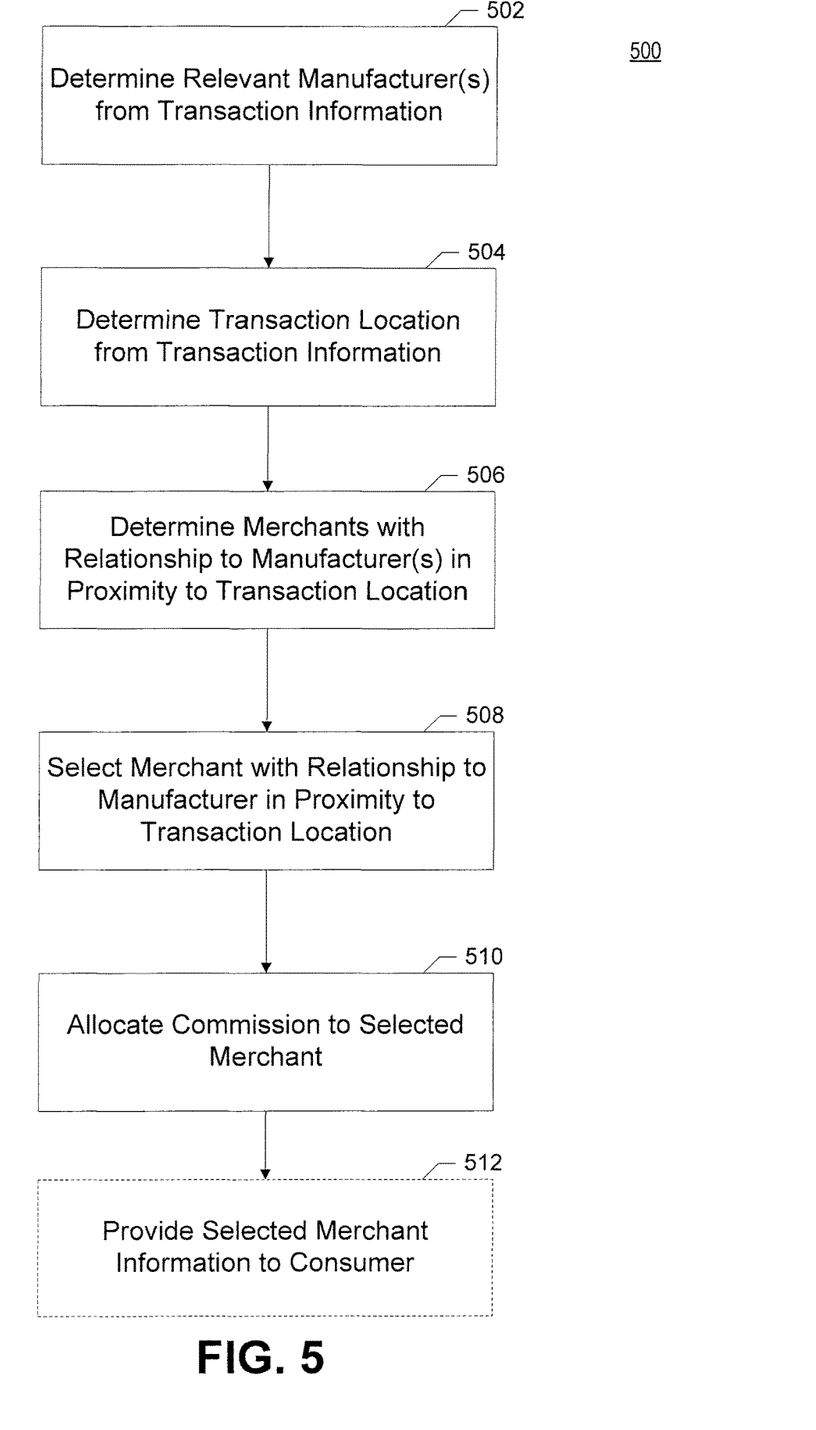
FIG. 5 depicts a flow diagram of a process for selecting a merchant to receive a commission in accordance with some embodiments described herein.

FIGS. 4-5 show example methods, namely processes 400, and 500 that may be executed by one or more machines (some examples of which are discussed in connection with FIGS. 1 and 2), in accordance with some embodiments discussed herein.

FIG. 4 depicts an example process 400 for allocating a sales commission in accordance with some embodiments of the present invention. As described above, embodiments may facilitate the allocation of sales commissions from transactions. Embodiments may further assist with allocation of default commissions to particular merchants even in cases where it is not readily possible to determine which merchant was the cause of a particular transaction. For example, example embodiments provide for allocation of a sales commission even where a consumer is not associated with a particular merchant and the consumer does not specify a merchant during the transaction. In this manner, embodiments advantageously provide for improved marketing utility of sales commissions by ensuring that the sales commissions are awarded to merchants to incentivize marketing a particular manufacturer's products even where a particular merchant has not been identified as associated with the particular transaction from which the sales commission is derived.

At action 402, transaction information is received. The transaction information may correspond to information associated with a sales transaction performed by an e-commerce store front. For example, the transaction information may include, without limitation, the consumer's name, the consumer's address, the consumer's phone number, a user identifier, a list of products purchased, a merchant name, consumer billing information, or the like.

At action 404, a determination is made as to whether a sale commission is associated with the transaction. A sales commission may be appropriate in some scenarios, but not others. For example, some products offered by the e-commerce store front may be associated with manufacturer commission incentives, while others may not. As another example, a sales commission may not apply to some consumer purchases, such as in the case where the purchasing consumer is an employee of the distributor or manufacturer. As described above with respect to FIGS. 1 and 3, in some embodiments a single transaction may give rise to multiple sales commissions, such as where multiple products from different manufacturers are included in the transaction. In such cases, a separate sales commission allocation process may be performed for each separate commission.

At action 406, a determination is made as to whether a relationship exists between the consumer making the transaction and a particular merchant. The process 400 may consult a merchant datastore or relationship management module as described above with respect to FIGS. 1-3 to determine whether a relationship exists between the consumer and a particular merchant. For example, if the consumer has previously indicated that their hair is styled at a particular salon or by a particular stylist, then the particular salon or stylist may be associated with the transaction for commission allocation purposes. Alternately, the transaction information itself may indicate a relationship with a particular merchant, such as in the case where the consumer provides the name or other identifier for the merchant during the transaction.

At action 408, the process 400 branches depending upon whether a relationship exists between the consumer and a particular merchant. If a relationship exists, the process 400 proceeds to action 410. If no relationship exists, the process 400 proceeds to action 412.

At action 410, a determination is made as to whether the merchant with the relationship is eligible for the sales commission. Although in most circumstances manufacturers may offer to pay the sales commission to any merchant that can be clearly identified as responsible for the sale of their products, some manufacturers may only offer sales commissions to certain preferred or authorized merchants. If the merchant with whom the consumer has a relationship is not authorized by the merchant, than the sales commission may not be allocated. As such, if the merchant is not eligible for the sales commission, the process 400 may proceed to action 414 where the default commission allocation process occurs. Alternately, in some embodiments where the sales commission is not allocated to the particular merchant, the commission may be refunded to the manufacturer or allocated to the distributor. At action 412, if the merchant is eligible for the sales commission, the sales commission may be allocated to the merchant for payment. Payment of the sales commission may include, as noted above with respect to FIG. 3, crediting of the merchant's account, issuing a check to the merchant, or any other known method of providing a commission reward.

At action 412, if a relationship between the consumer and a merchant cannot be identified or the particular merchant is not eligible for the sales commission, the sales commission may be allocated according to a default method. As noted above, this default method may attempt to maximize the marketing benefit for the manufacturer or distributor derived from the sales commission. An example embodiment of a process for allocating sales commissions in this manner is described further below with respect to FIG. 5.

FIG. 5 depicts an example process 500 for providing a default commission allocation in accordance with some embodiments of the present invention. As described above, embodiments may allocate sales commission that would not otherwise be allocated in a way that improves the marketing utility derived from offering these commissions. In this manner, if, as described above with respect to FIG. 4, a product distribution system cannot determine if a consumer making a transaction has a relationship with any particular merchant, the process 500 may ensure that the commission is efficiently allocated. For example, embodiments of the process may allocate the commission for the transaction to a merchant in geographical proximity to the consumer, a merchant that is newly registered with the product distribution service, a merchant that has not received a sales commission in at least a certain period of time, or according to various other factors.

At action 502, a relevant manufacturer or manufacturers may be determined for a particular transaction. The transaction may include a plurality of products and/or services. The process 500 may identify which manufacturer or manufacturers are associated with each product or service associated with the transaction. In some embodiments, the process 500 may identify a single manufacturer as the primary manufacturer for the transaction by identifying a manufacturer that is associated with a majority of the spending volume of the transaction. For example, if greater than 50% of the sales price of the transaction is associated with products for a single manufacturer, that manufacturer may be identified as the primary manufacturer. A manufacturer identified as the primary manufacturer may be used to determine the entire commission allocation for the transaction, even for sales commissions associated with products or services of the transaction not associated with the manufacturer.

As an alternative to identifying a single manufacturer, multiple manufacturers may be identified for the transaction. For example, each manufacturer for a product or service included in the transaction may be identified, and the sales commission may be divided among the manufacturers in proportion to the spending volume of each manufacturer's products in the transaction.

At action 504, a transaction location is determined using the transaction information. The transaction location may be determined based on the delivery location or billing address of the transaction.

At action 506, the transaction location and the primary manufacturer may be utilized to determine a set of merchants with a relationship to the manufacturer in proximity to the transaction location. For example, the process 500 may identify a threshold number of merchants (e.g., 50 merchants) with a relationship with the manufacturer within a certain search radius (e.g., 5 miles) of the transaction information. In the event that the threshold number of merchants cannot be located in the initial search radius, the search radius may be expanded until at least the threshold number of merchants is identified. Alternately, if too many merchants are located within the search radius, the search radius may be contracted until the threshold number of merchants is identified.

At action 508, a merchant is selected from the list of merchants identified at action 506. Selection of the merchant may be performed in a manner so as to maximize the marketing benefit from the sales commission offering. In this manner, embodiments may employ different selection criteria for commission allocation in different scenarios.

For example, one process for selection of a merchant may include selecting a recently registered merchant with a product distribution system. Providing the sales commission to a recently registered merchant may help illustrate to the merchant how the default commission allocation process functions, and to highlight the benefit of the system to the merchant to encourage the merchant to steer their clients to make purchases via the product distribution system.

As another example, merchants may be selected by taking into account the relationship of the merchant to the manufacturer. For example, some manufacturers may indicate that particular merchants have a "preferred" or "tier one" status. This status may be conferred on a merchant by a manufacturer based on the merchant completing product training courses in the manufacturer's products, based on the merchant selling a minimum volume of the manufacturer's products, or the like. Merchants that meet the requirements for this status may be more likely to be selected for receiving a sales commission than merchants that do not meet this status, thus incentivizing merchants to strive to obtain the status. In some embodiments, merchants may identify multiple different status (e.g., a "tier one" status representing the top 10% of sales volume for the merchant in the region, a "tier two" status representing the next 35% of sales volume, or the like). In some embodiments, merchant statuses are calculated dynamically based on analytic data acquired by the product distribution system. For example, all merchants in the top 10% of sales for a particular manufacturer for a particular time period (e.g., per day, week, month, or year) may be automatically designated as preferred merchants for the manufacturer.

As yet another example, merchants may be selected based on their skill set in relation to the transaction information. For example, a merchant may be highly rated by consumers through a relationship management module for providing a particular type of service (e.g., hair coloring), and as such may be more likely to be selected to receive the sales commission when the sales commission includes products associated with the merchant's skill set (e.g., hair dye). These ratings could be provided by consumers, by other merchants (e.g., peer reviews), based on the merchant's having completed certain training courses or certifications, based on the merchant being certified as an expert in a particular product by the product manufacturer, or the like. Ratings may also be employed to influence the selection process to select the merchants that have the highest ratings, to incentivize merchants to provide the highest level of service possible.

As a further example, merchants may be selected based on the purchase history of consumers who have indicated a relationship with the merchant. In this manner, embodiments may leverage the interaction with a store front system to identify which products have been previously sold to consumers that indicated a relationship with the merchant, and increasing the likelihood that a merchant will be selected for a default commission where the transaction includes products that have been previously associated with the merchant. Since merchants are likely to have a preferred set of products they frequently recommend to consumers, allocating sales commissions in this manner may improve the likelihood that the merchant that actually marketed the product to the consumer receives the commission, while also incentivizing the merchant to continue marketing the product even when consumers forget to indicate the relationship with the merchant at the time of sale.

As yet another example, selection of the merchant may be apportioned among different classes of merchants. For example, the group of merchants identified may include both companies (e.g., salons) and individual employees or contractors (e.g., stylists). Embodiments may weight default commission selections between these different classes. Additionally, embodiments may include methods for apportioning the commission between an employer and an employee, such that both receive a portion of the same sales commission according to a negotiated rate (e.g., 50% to the employer, 50% to the employee).

As an additional example, selection of the merchant may be based on the time since a merchant was last selected. For example, some embodiments may involve a "round robin" default commission allocation process whereby the selected merchant is the merchant that has not received a default commission in the longest time.

It should be readily appreciated that these examples may be included in various combinations to assist with selection of a merchant in a manner that improves the marketing utility of sales commissions. For example, each factor described above could be employed in a weighting algorithm to assist with merchant selection. In some embodiments, merchant selection is also performed in a randomized manner. Selection in a randomized manner may be weighted by the factors described above.

It should further be appreciated that although the instant examples describe constraining the merchant selection pool based on proximity to the transaction location and based on an associated manufacturer, alternative embodiments may employ additional or alternative methods of constraining the merchant selection pool. For example, an alternative embodiment may select among all merchants in the same state as the transaction billing address, or all merchants registered with the product distribution system may be eligible for selection as opposed to merchants associated with a particular manufacturer.

At action 510, the sales commission is allocated to the merchant selected at action 508. As noted above, allocation of the sales commission may include payment of the sales commission to the merchant, crediting an account associated with the merchant, or the like.

In some embodiments, at action 512 the process 500 may optionally allow for generation of a sales lead for the selected merchant. Since the default commission allocation process is likely to be frequently invoked in response to a consumer failing to indicate they have a prior relationship with a local merchant, embodiments may advantageously note that fact and assist with forming a relationship between the merchant and the consumer. For example, the consumer may be presented with a notification stating "This stylist is an expert in using the product you just purchased. Here is their contact information. Would you like to make an appointment?" The notification may further include information allowing the consumer to contact the merchant (e.g., telephone number, e-mail address, or a fillable communication form) and a list of reasons that the merchant was selected (e.g., expertise with product, preferred merchant for manufacturer, close proximity to consumer). The notification may not indicate to the user that the merchant received a commission from the user's purchase, although it may in some embodiments.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as the processor 202, as discussed above with reference to FIG. 2, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., the memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for identifying a local merchant from among a threshold number of merchants located with a dynamic search radius, the method comprising:

receiving, at an e-commerce interface, transaction information for a transaction, via a network, from an e-commerce system, the transaction information indicating a purchase was made via the online e-commerce system, wherein the transaction information comprises an indication of at least one product or service for which a sales commission is offered, manufacturer information indicative of a respective manufacturer for each of the at least one product or service, and a transaction location indicated by a delivery or billing address;

determining, via a processor, that the transaction information does not identify a particular merchant to receive the sales commission;

in response to determining, via the processor, that the transaction information does not identify a particular merchant to receive the sales commission, selecting, using the processor, one or more merchants to receive the sales commission, wherein the selecting comprises:

determining that the transaction information does not comprise relationship information indicative of a merchant to which the sales commission should be provided;

determining that no direct customer-merchant relationship exists by accessing a relationship management module, the relationship management module comprising information related to managing relationships between consumers and merchants, the relationship management module determining that a consumer identified by the transaction information has not been associated with any merchant within a merchant datastore; and in response to determining that no direct customer-merchant relationship exists, determining a list of merchants selected from a plurality of merchants, wherein determining the list of merchants from among the plurality of merchants comprises:

applying an initial search radius to location information indicative of the transaction location, determining one or more merchants located within the initial search radius, determining whether a number of the one or more merchants meets a predefined threshold number of merchants, in an instance in which the predefined threshold number of merchants cannot be located within the initial search radius, applying an expanded search radius until at least the predefined threshold number of merchants is identified, and wherein in an instance in which more than the predefined threshold number of merchants are located within the initial search radius, applying a contracted search radius until the predefined threshold number of merchants is identified;

upon determination of the list of merchants based on the application of the initial search radius and expanded or contracted search radius, selecting, for each of the at least one product or service associated with a respective manufacturer, the one or more merchants from the list of merchants based on based on a respective skill set in relation to the transaction information by accessing the relationship management module, identifying from the list of merchants those merchants that provide a type of service identified in the transaction information, and determining the one or more merchants from those merchants that provide the type of service identified in the transaction information that has the highest rating; and providing the sales commission, divided among the selected one or more merchants, in proportion to a proportion of products associated with each manufacturer in the transaction, to the selected one or more merchants, wherein sales commissions are provided by crediting a respective account associated with each of the selected one or more merchants.

2. The method of claim 1, further comprising:

determining at least one manufacturer for the at least one product or service; and determining the list of merchants based at least in part on whether each of the plurality of merchants is associated with the at least one manufacturer.

3. The method of claim 2, further comprising determining whether each of the merchants of the plurality of merchants is associated with the at least one manufacturer based at least in part on a sales volume of products associated with the at least one manufacturer sold by each of the plurality of merchants.

4. The method of claim 1, wherein selection of the at least one merchant from a list of merchants selected from a plurality of merchants is based at least in part on a length of time since the at least one merchant registered with a product distribution system.

5. The method of claim 1, wherein selection of the at least one merchant is based at least in part on a length of time since the at least one merchant last received a sales commission that was not associated with an eligible merchant based on the transaction information.

6. The method of claim 1, wherein the merchant is a hair stylist or salon, and wherein the at least one product or service is a hair care product.

7. The method of claim 1, further comprising providing a consumer associated with the transaction contact information for the selected at least one merchant.

8. The method of claim 1, wherein the selected at least one merchant is selected based at least in part on the at least one merchant's prior sales of the at least one product or service.

9. The method of claim 1, further comprising determining a primary manufacturer for the transaction based on the at least one product or service associated with the transaction, and wherein the selected at least one merchant is selected based at least in part on a relationship between the selected at least one merchant and the primary manufacturer.

10. An apparatus for identifying a local merchant from among a threshold number of merchants located with a dynamic search radius, the apparatus comprising at least one processor coupled to a memory, the memory comprising computer executable instructions that, when executed by the processor, configure the apparatus to:

receive, at an e-commerce interface, transaction information for a transaction, via a network, from an e-commerce system, the transaction information indicating a purchase was made via the online e-commerce system, wherein the transaction information comprises an indication of at least one product or service for which a sales commission is offered, manufacturer information indicative of a respective manufacturer for each of the at least one product or service, and a transaction location indicated by a delivery or billing address;

determine, via a processor, that the transaction information does not identify a particular merchant to receive the sales commission;

in response determining, via the processor, that the transaction information does not identify a particular merchant to receive the sales commission, select, using the processor, one or more merchants to receive the sales commission, wherein the selection comprises:
    determining that the transaction information does not comprise relationship information indicative of a merchant to which the sales commission should be provided;
    determining that no direct customer-merchant relationship exists by accessing a relationship management module, the relationship management module comprising information related to managing relationships between consumers and merchants, the relationship management module determining that a consumer identified by the transaction information has not been associated with any merchant within a merchant datastore, and
    in an instance in which a direct customer-merchant relationship exists; and in response to determining that no direct customer-merchant relationship exists, determining a list of merchants selected from a plurality of merchants, wherein determining the list of merchants from among the plurality of merchants comprises:
    applying an initial search radius to location information indicative of the transaction location, determining one or more merchants located within the initial search radius, determining whether a number of the one or more merchants meets a predefined threshold number of merchants, in an instance in which the predefined threshold number of merchants cannot be located within the initial search radius, applying an expanded search radius until at least the predefined threshold number of merchants is identified, and wherein in an instance in which more than the predefined threshold number of merchants are located within the initial search radius, applying a contracted search radius until the predefined threshold number of merchants is identified;
    upon determination of the list of merchants based on the application of the initial search radius and expanded or contracted search radius, select, for each of the at least one product or service associated with a respective manufacturer, the one or more merchants from the list of merchants based on based on a respective skill set in relation to the transaction information by accessing the relationship management module, identifying from the list of merchants those merchants that provide a type of service identified in the transaction information, and determining the one or more merchants from those merchants that provide the type of service identified in the transaction information that has the highest rating; and
    provide the sales commission, divided among the selected one or more merchants, in proportion to a proportion of products associated with each manufacturer in the transaction, to the selected one or more merchants,
    wherein sales commissions are provided by crediting a respective account associated with each of the selected one or more merchants.

11. The apparatus of claim 10, further configured to:
    determine at least one manufacturer for the at least one product or service; and
    determine the list of merchants based at least in part on whether each of the plurality of merchants is associated with the at least one manufacturer.

12. The apparatus of claim 11, further configured to determine whether each of the merchants of the plurality of merchants is associated with the at least one manufacturer based at least in part on a sales volume of products associated with the at least one manufacturer sold by each of the plurality of merchants.

13. The apparatus of claim 10, wherein selection of the at least one merchant from a list of merchants selected from a plurality of merchants is based at least in part on a length of time since the at least merchant registered with a product distribution system.

14. The apparatus of claim 10, wherein selection of the at least one merchant is based at least in part on a length of time since the at least one merchant last received a sales commission that was not associated with an eligible merchant based on the transaction information.

15. The apparatus of claim 10, further configured to, in response to determining that the transaction information does identify a particular merchant to receive the sales commission, determine whether the particular merchant is authorized to receive a commission from a manufacturer associated with the at least one product.

16. The apparatus of claim 10, wherein the merchant is a hair stylist or salon, and wherein the at least one product or service is a hair care product.

17. The apparatus of claim 10, further configured to provide a consumer associated with the transaction contact information for the selected at least one merchant.

18. The apparatus of claim 10, wherein the selected at least one merchant is selected based at least in part on the at least one merchant's prior sales of the at least one product or service.

19. The apparatus of claim 10, further configured to determine a primary manufacturer for the transaction based on the at least one product or service associated with the transaction, and wherein the selected at least one merchant is selected based at least in part on a relationship between the selected at least one merchant and the primary manufacturer.

20. The apparatus of claim 15, further configured to, in response to determining the particular merchant is authorized to receive a commission from a manufacturer associated with the at least one product, select the particular merchant as the selected at least one merchant.

21. A non-transitory computer readable storage medium comprising instructions that, when executed by a processor, configure the processor to:
    receive, at an e-commerce interface, transaction information for a transaction, via a network, from an e-commerce system, the transaction information indicating a purchase was made via the online e-commerce system, wherein the transaction information comprises an indication of at least one product or service for which a sales commission is offered, manufacturer information indicative of a respective manufacturer for each of the at least one product or service, and a transaction location indicated by a delivery or billing address;
    determine, via a processor, that the transaction information does not identify a particular merchant to receive the sales commission;
    in response determining, via the processor, that the transaction information does not identify a particular merchant to receive the sales commission, select, using the processor, one or more merchants to receive the sales commission,
    wherein the selection comprises:
        determining that the transaction information does not comprise relationship information indicative of a merchant to which the sales commission should be provided;

determining that no direct customer-merchant relationship exists by accessing a relationship management module, the relationship management module comprising information related to managing relationships between consumers and merchants, the relationship management module determining that a consumer identified by the transaction information has not been associated with any merchant within a merchant datastore, and in an instance in which a direct customer-merchant relationship exists; and in response to determining that no direct customer-merchant relationship exists, determining a list of merchants selected from a plurality of merchants, wherein determining the list of merchants from among the plurality of merchants comprises:

applying an initial search radius to location information indicative of the transaction location, determining one or more merchants located within the initial search radius, determining whether a number of the one or more merchants meets a predefined threshold number of merchants, in an instance in which the predefined threshold number of merchants cannot be located within the initial search radius, applying an expanded search radius until at least the predefined threshold number of merchants is identified, and wherein in an instance in which more than the predefined threshold number of merchants are located within the initial search radius, applying a contracted search radius until the predefined threshold number of merchants is identified;

upon determination of the list of merchants based on the application of the initial search radius and expanded or contracted search radius, select, for each of the at least one product or service associated with a respective manufacturer, the one or more merchants from the list of merchants based on based on a respective skill set in relation to the transaction information by accessing the relationship management module, identifying from the list of merchants those merchants that provide a type of service identified in the transaction information, and determining the one or more merchants from those merchants that provide the type of service identified in the transaction information that has the highest rating; and provide the sales commission, divided among the selected one or more merchants, in proportion to a proportion of products associated with each manufacturer in the transaction, to the selected one or more merchants, wherein sales commissions are provided by crediting a respective account associated with each of the selected one or more merchants.

22. The computer readable storage medium of claim 21, wherein the instructions further configure the processor to:

determine at least one manufacturer for the at least one product or service; and determine the list of merchants based at least in part on whether each of the plurality of merchants is associated with the at least one manufacturer.

23. The computer readable storage medium of claim 22, wherein the instructions further configure the processor to determine whether each of the merchants of the plurality of merchants is associated with the at least one manufacturer based at least in part on a sales volume of products associated with the at least one manufacturer sold by each of the plurality of merchants.

24. The computer readable storage medium of claim 21, wherein selection of the at least one merchant from a list of merchants selected from a plurality of merchants is based at least in part on a length of time since the at least merchant registered with a product distribution system.

25. The computer readable storage medium of claim 21, wherein selection of the at least one merchant is based at least in part on a length of time since the at least one merchant last received a sales commission that was not associated with an eligible merchant based on the transaction information.

26. The computer readable storage medium of claim 21, wherein the instructions further configure the processor to in response to determining that the transaction information does identify a particular merchant to receive sales commission, determine whether the particular merchant is authorized to receive a commission from a manufacturer associated with the at least one product.

27. The computer readable storage medium of claim 21, wherein the merchant is a hair stylist or salon, and wherein the at least one product or service is a hair care product.

28. The computer readable storage medium of claim 21, wherein the instructions further configure the processor to provide a consumer associated with the transaction contact information for the selected merchant.

29. The computer readable storage medium of claim 21, wherein the selected at least one merchant is selected based at least in part on the at least one merchant's prior sales of the at least one product or service.

30. The computer readable storage medium of claim 21, wherein the instructions further configure the processor to determine a primary manufacturer for the transaction based on the at least one product or service associated with the transaction, and wherein the selected at least one merchant is selected based at least in part on a relationship between the selected at least one merchant and the primary manufacturer.

31. The computer readable storage medium of claim 26, wherein the instructions further configure the processor to, in response to determining the particular merchant is authorized to receive a commission from a manufacturer associated with the at least one product, select the particular merchant as the selected at least one merchant.

* * * * *